(12) United States Patent
Kulkarni

(10) Patent No.: US 11,223,615 B2
(45) Date of Patent: Jan. 11, 2022

(54) PROVISIONING INITIAL KEYSTORE FOR MULTI-TENANT, MICROSERVICE ARCHITECTURE-BASED INTEGRATION SERVICE IN A CLOUD COMPUTING ENVIRONMENT SETUP

(71) Applicant: SAP SE, Walldorf (DE)

(72) Inventor: Gopalkrishna Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 251 days.

(21) Appl. No.: 16/453,067

(22) Filed: Jun. 26, 2019

(65) Prior Publication Data

US 2020/0358757 A1    Nov. 12, 2020

(30) Foreign Application Priority Data

May 9, 2019    (IN) .............................. 201911018532

(51) Int. Cl.
*H04L 29/06* (2006.01)
(52) U.S. Cl.
CPC ...... *H04L 63/0823* (2013.01); *H04L 63/0884* (2013.01); *H04L 63/0892* (2013.01)
(58) Field of Classification Search
CPC ............. H04L 63/0823; H04L 63/0884; H04L 63/0892; H04L 63/06; H04L 67/10
See application file for complete search history.

(56) References Cited

U.S. PATENT DOCUMENTS

| 2012/0179907 | A1* | 7/2012 | Byrd ..................... H04L 9/3268 713/156 |
| 2015/0089232 | A1* | 3/2015 | Belton ................ H04L 63/0823 713/175 |
| 2015/0244707 | A1* | 8/2015 | Bowen ...................... H04L 9/14 713/158 |
| 2018/0019993 | A1* | 1/2018 | Kravitz ................. G06F 21/645 |
| 2019/0052456 | A1* | 2/2019 | Bygrave ............... H04L 9/3234 |
| 2019/0149342 | A1* | 5/2019 | Fynaardt ................. H04L 63/00 713/156 |

* cited by examiner

*Primary Examiner* — Huan V Doan
(74) *Attorney, Agent, or Firm* — Buckley, Maschoff & Talwalker LLC

(57) ABSTRACT

According to some embodiments, methods and systems may include a provisioning application platform processor to receive a user request for an integration service. The provisioning application platform processor may then transmit information to a platform resource manager processor to facilitate creation of a plurality of microservices resulting in implementation of the integration service for a tenant associated with the user. A multi-tenant keystore management service, automatically deployed upon implementation of the integration service, may automatically call a trusted authority platform. The multi-tenant keystore management service may then receive a signed security certificate from the trusted authority platform and add the signed security certificate to a keystore deployed to the tenant.

21 Claims, 9 Drawing Sheets

PROVISIONING INITIAL KEYSTORE FOR MULTI-TENANT, MICROSERVICE ARCHITECTURE-BASED INTEGRATION SERVICE IN A CLOUD COMPUTING ENVIRONMENT SETUP

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support multiple tenants and create applications using multiple microservices (e.g., one microservice might be associated with a user interface while another microservice handles database resources). Moreover, to enhance security the system may obtain signed certificates from a trusted authority when an integration service is setup for a user. This is generally performed manually by an administrator when the provisioning of an integration service tenant is complete (e.g., including the creation of passwords, the request for the signed certificate, validation of the certificate, etc.). Provisioning microservices and obtaining certificates appropriately in such cases, however, can be a difficult task. It would therefore be desirable to provide for the provision of an initial keystore for a multi-tenant, microservice architecture-based integration service in a cloud computing environment setup in a secure, automatic, and efficient manner.

SUMMARY

According to some embodiments, methods and systems may include a provisioning application platform processor to receive a user request for an integration service. The provisioning application platform processor may then transmit information to a platform resource manager processor to facilitate creation of a plurality of microservices resulting in implementation of the integration service for a tenant associated with the user. A multi-tenant keystore management service, automatically deployed upon implementation of the integration service, may automatically call a trusted authority platform. The multi-tenant keystore management service may then receive a signed security certificate from the trusted authority platform and add the signed security certificate to a keystore deployed to the tenant.

Some embodiments comprise: means for receiving, at a provisioning application platform processor, a user request for an integration service; means for transmitting information to a platform resource manager processor to facilitate creation of a plurality of microservices resulting in implementation of the integration service for a tenant associated with the user; means for, upon implementation of the integration service, automatically deploying a multi-tenant keystore management service; means for automatically calling, by the multi-tenant keystore management service, a trusted authority platform; means for receiving a signed security certificate from the trusted authority platform; and means for adding the signed security certificate to a keystore deployed to the tenant.

Some technical advantages of some embodiments disclosed herein are improved systems and methods to provide for the provision of an initial keystore for a multi-tenant, microservice architecture-based integration service in a cloud computing environment setup in a secure, automatic, and efficient manner.

DETAILED DESCRIPTION

Figure 1:
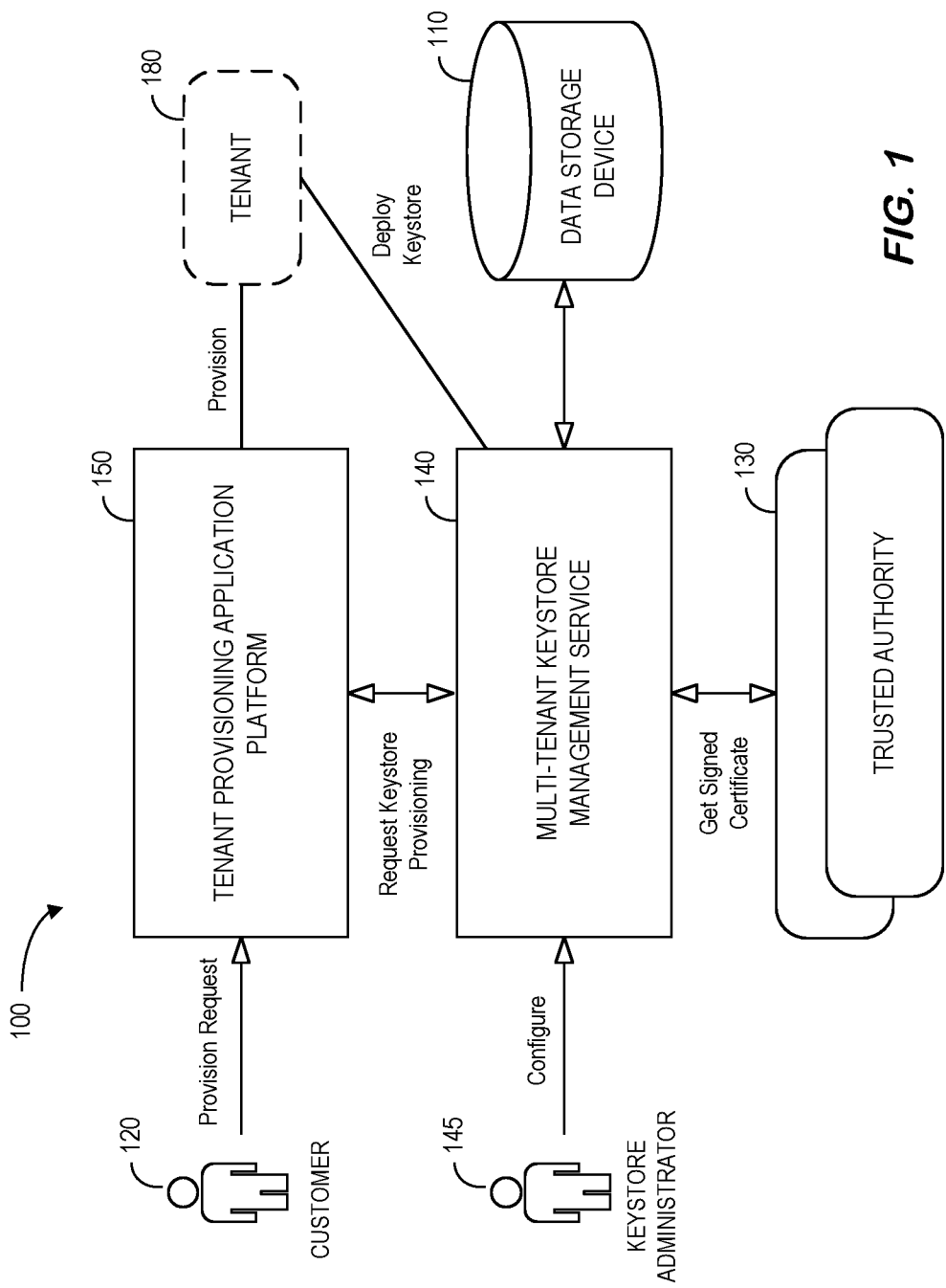
FIG. 1 is a high-level block diagram of a system in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To make outbound Hyper-Text Transfer Protocol Secure Socket Layer ("HTTPS") calls in an integration service tenant, a default certificate key pair may be required for each tenant in a cloud computing environment. Typically, this certificate is deployed by an administrator after the provisioning of an integration service tenant complete and may involve some or all of the following manual steps:

Creating passwords manually;

Requesting a signed certificate (from a third party such as SEMANTEC®);

Validating that the signed certificate is approved, constructing a new tenant keystore, combining the signed certificate with intermediate certificates, and deploying the certificate to the tenant; and In a multi-cloud set up, deploying to the tenant may be challenging because the tenant administrator may need sufficient rights to keep the keystore in a secure store (which is this the place that holds the secure artifacts).

This process is manual and time consuming. Also, the life cycle management (e.g., renewal and/or deletion) of the certificate can become complicated because human intervention is needed.

To avoid such a result, some embodiments described herein may provide an automated method of provisioning the initial keystore on an integration service tenant in a multi-cloud environment. Embodiments may solve the problem for the integration service offered, built on microservice architecture for multiple deployments (known as systems) of a service involving several interlinked services.

In particular, some embodiments offer a multi-tenant keystore management service (also referred to herein as a "multi-cloud keystore management service"). This service may either be combined with a provisioning service (if available) or can be used as a stand-alone service. The service may encompass the manual steps mentioned above programmatically. In addition, embodiments may provide a user interface with security checks that a tenant administrator can utilize to check signed certificate that are acquired for consuming tenants. Moreover, the multi-cloud keystore management service may also support life cycle management of the certificate, including removal (revoke) of the certificate from a tenant (e.g., as may be required when a customer contract is terminated) and/or the automatic renewal of certificates upon an expiration event (e.g., after a pre-determined period of time).

FIG. 1 is a high-level block diagram of a system 100 in accordance with some embodiments. The system 100 includes a tenant provisioning application platform 150 and a multi-tenant keystore management service 140 that accesses user entitlement information in a data storage device 110. The tenant provisioning application platform 150 might use this information, for example, to create an integration service for a tenant 180 associated with a user or customer 120. The tenant provisioning application platform 150 may communicate with an integration service platform configured with a platform resource manager and event notifier that interacts with a cloud platform and creates the integration service from microservices. A keystore administrator 145 may access the multi-tenant keystore management service 140 in connection with signed security certificates to be obtained from a trusted authority 130. The process might be performed automatically or be initiated via a command from a remote operator interface device. As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The tenant provisioning application platform 150 and/or multi-tenant keystore management service 140 may store information into and/or retrieve information from various data stores (e.g., the data storage device 110), which may be locally stored or reside remote from the tenant provisioning application platform 150. Although a single tenant provisioning application platform 150 and multi-tenant keystore management service 140 are shown in FIG. 1, any number of such devices may be included. Moreover, various devices described herein might be combined according to embodiments of the present invention. For example, in some embodiments, the data storage device 110 and the multi-tenant keystore management service 140 might comprise a single apparatus. The system 100 functions may be performed by a constellation of networked apparatuses, such as in a distributed processing or cloud-based architecture.

A user or administrator may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how microservices interact) and/or provide or receive automatically generated recommendations or results from the system 100.

Thus, embodiments described herein may provide a multi-tenant keystore management service that may be called by a provisioning service after a tenant is successfully provisioned. Then the keystore management service may call a trusted authority after creating an appropriate request and getting a signed certificate. This certificate may be added to a template keystore created by the service beforehand (and may then be deployed to the tenant). Note that implementations may vary depending upon the architecture of the integration service. In some cases, a cloud platform integration for multi-cloud may be built using a microservice architecture (e.g., and the underlying platform may comprise CLOUD FOUNDRY®).

Figure 2:
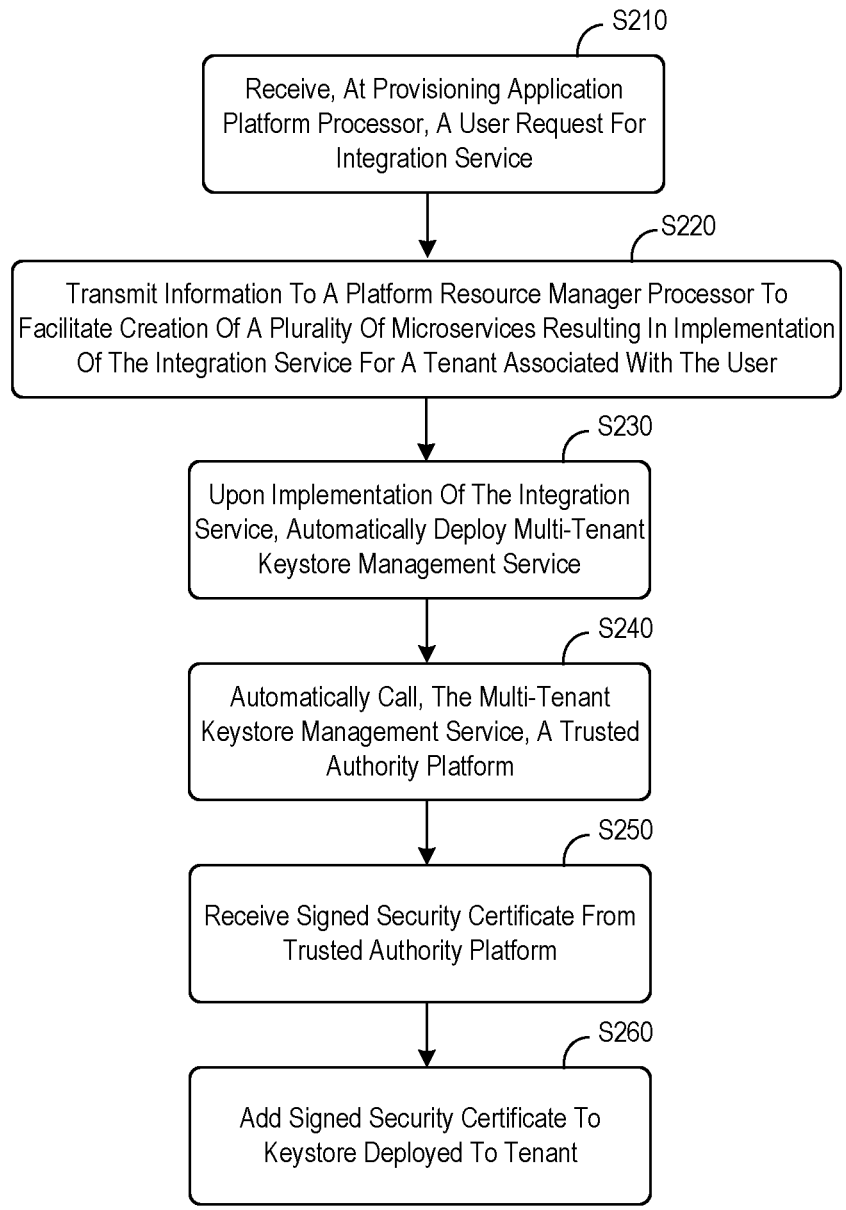
FIG. 2 is a method according to some embodiments.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a provisioning application platform processor may receive a user request for an integration service. According to some embodiments, the provisioning application platform processor is associated with a Software-as-a-Service ("SaaS") and/or a Platform-as-a-Service ("PaaS"). Moreover, the request from the user may be associated with a subscribe request. Note that the provisioning application platform processor may also verify that tenant-onboarding is completed successfully and/or support a decommissioning process.

Figure 3:
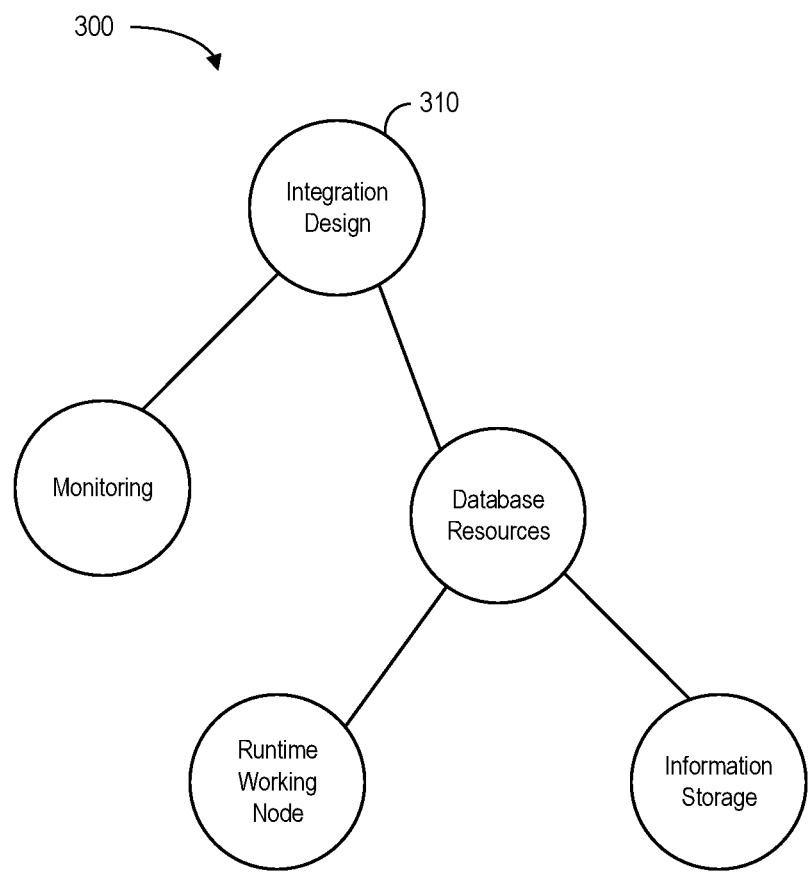
FIG. 3 is an example of an integration service in accordance with some embodiments.

At S220, the system may transmit information to a platform resource manager processor to facilitate creation of a plurality of microservices resulting in implementation of the integration service for a tenant associated with the user. For example, FIG. 3 is an example of an integration service 300 associated with multiple microservice components 310 in accordance with some embodiments. Each microservice component 310 might be associated with, for example, an integration design UI application, a monitoring UI application, a runtime working node, an information storage service, database resources, etc. According to some embodiments, the platform resource manager processor may create tenant specific resources, create tenant specific instances, and/or bind applications to the resources and instances. Note that the platform resource manager may be associated with an inbuild event publish/subscribe framework.

Upon implementation of the integration service, the system may automatically deploy a multi-tenant keystore management service at S230. At S240, the multi-tenant keystore management service may automatically call a trusted authority platform. At S250, a signed security certificate may be received from the trusted authority platform and the signed security certificate may be added to a keystore deployed to the tenant at S260.

Figure 4:
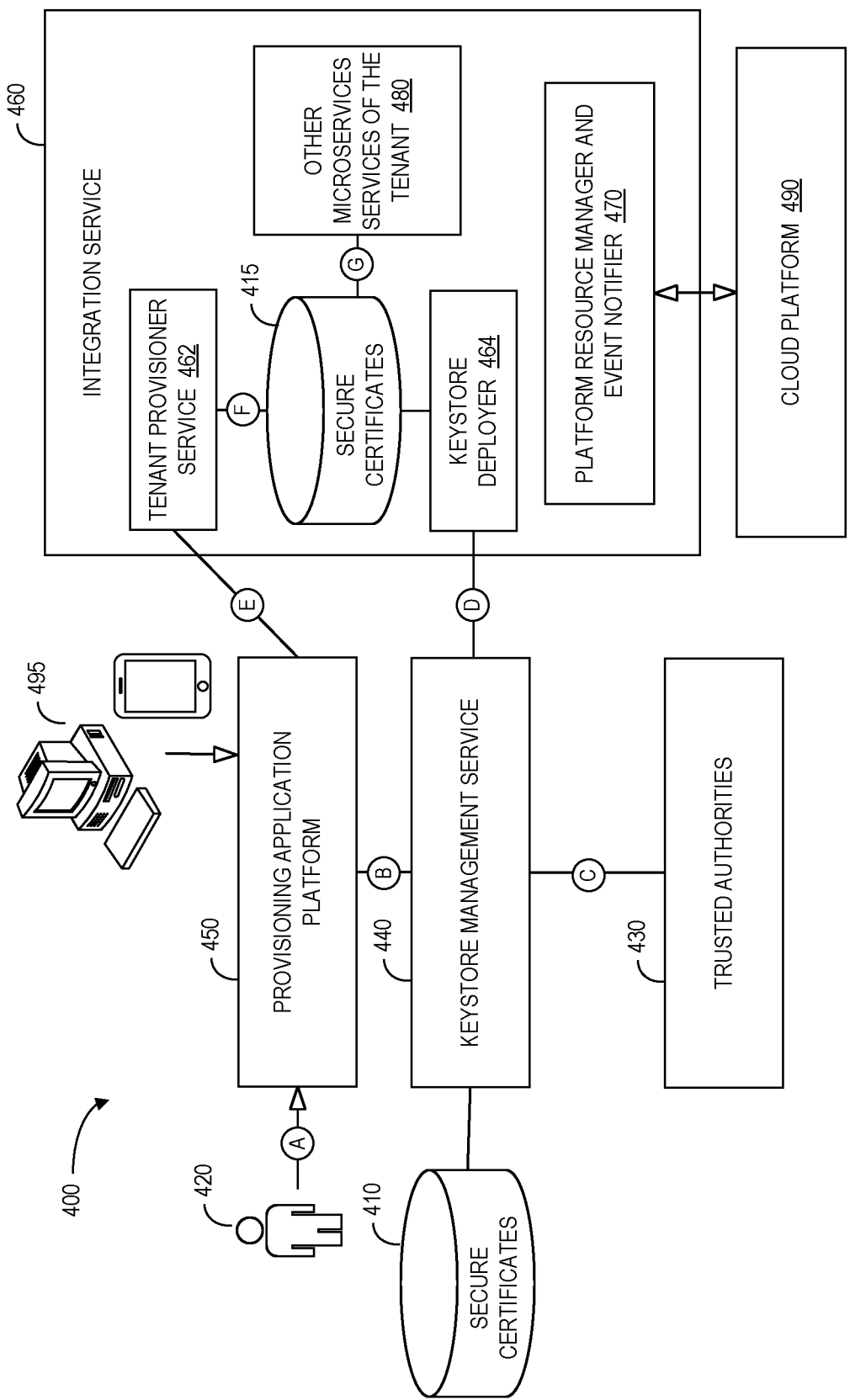
FIG. 4 is a more detailed high-level block diagram of a keystore provisioning system in accordance with some embodiments.

FIG. 4 is a more detailed high-level block diagram of a provisioning system 400 in accordance with some embodiments. As before, the system 400 includes a provisioning application platform 450 that exchanges information with a keystore management service 440 (e.g., that obtains certificates from trusted authorities 430 and stores them in 410). The provisioning application platform 450 might, for example, create an integration service 460 for a user 420. The provisioning application platform 450 may communicate with the integration service platform 460 configured with a platform resource manager and event notifier 470 that interacts with a cloud platform 490 and creates the integration service from microservices 480. The integration service platform 460 may further include secure certificates 415 that are accessed by a tenant provisioner service 462 and/or a keystore deployer 464. According to some embodiments, elements of the system 400 may be controlled by a remote device 495 associated with an operator or administrator.

According to some embodiments, a service may be built using set of microservices deployed in a cloud account. These services may work together to offer a tenant. Upon a request to provision a tenant at (A), the provisioning application platform 450 may first request a multi-tenant keystore management service 440 for a new keystore creation at (B). The keystore management service 440 may create a request and call a trusted authority 430 endpoint (e.g., DIGICERT) at (C) to get a new signed certificate and store it in secure store 410 (for retries). At (D), a helper service (e.g., keystore deployer 464) may also store the certificate in a secure store 415 which can then be used by other microservices 480 at (G). The provisioning application 450 then calls a tenant provisioner service 462 at (E) to onboard a tenant. This service may send notifications to all other services upon this request. The keystore deployer service 464 listens for the notification, retrieves the keystore from the secure stores at (F), and deploys it to the newly onboarded tenant. According to some embodiments, a tenant identifier may be used for this correlation.

Figure 5:
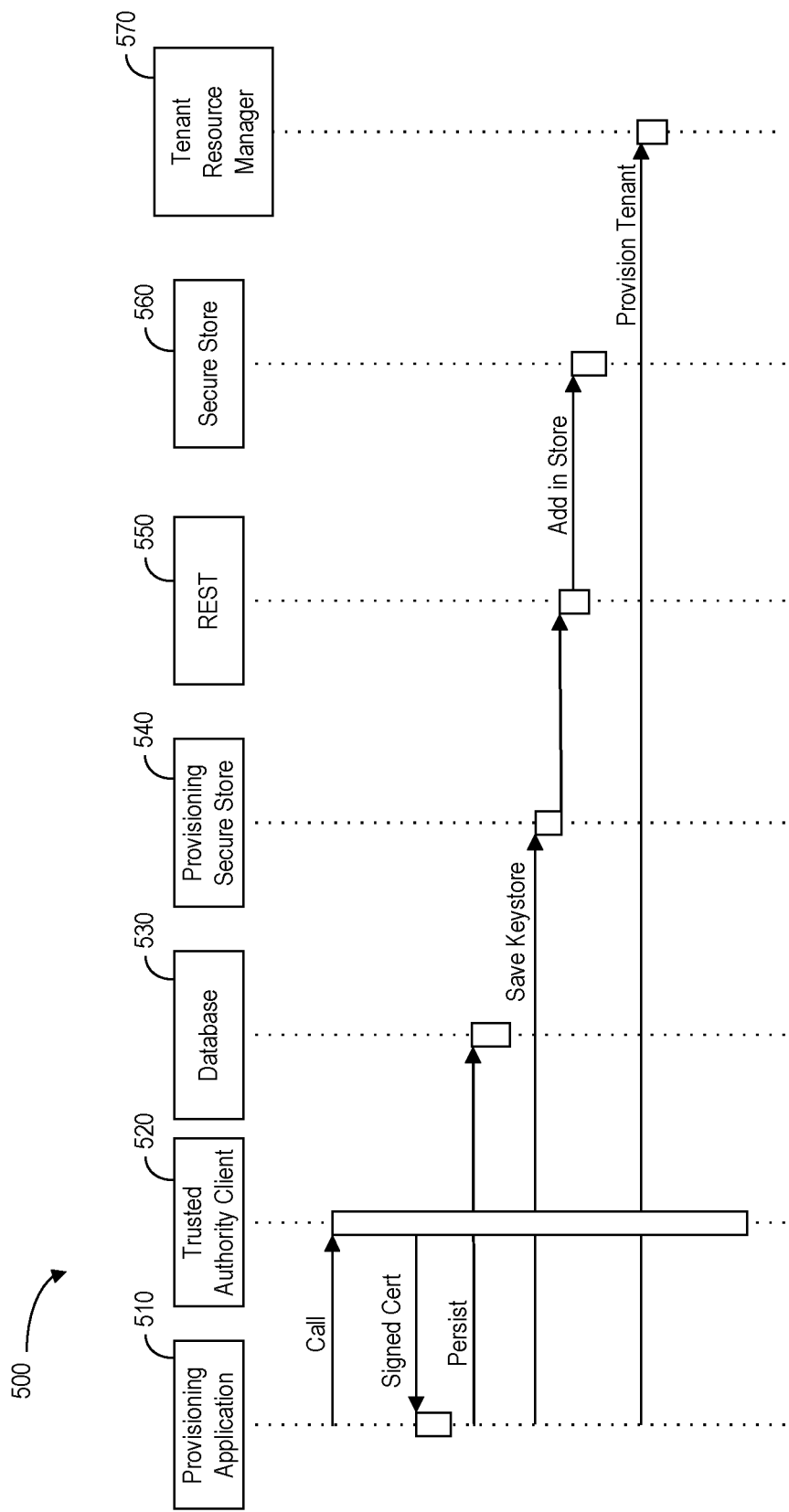
FIG. 5 is an information flow diagram of a keystore provisioning process according to some embodiments.
Figure 6:
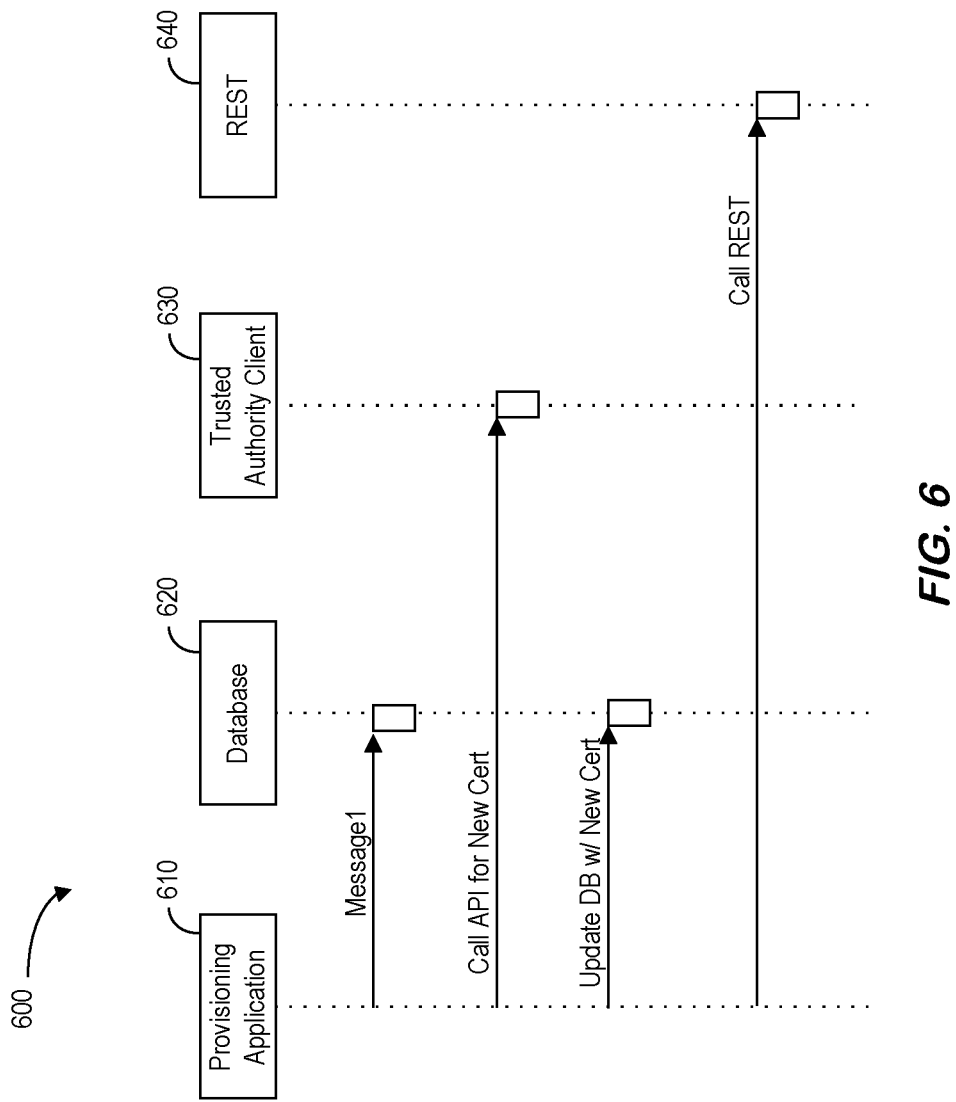
FIG. 6 is an information flow diagram of a keystore renewal process in accordance with some embodiments.

FIG. 5 is an information flow diagram of a keystore provisioning process 500 according to some embodiments. The process 500 includes a provisioning application 510, a trusted authority client 520, a database 530, a provisioning secure store 540, a Representational State Transfer ("REST") 550, a secure store 560, and a Tenant Resource Manager ("TRM") 570. Note that an initial keystore may contain a client certificate associated with a provisioned tenant. This may be issued, for example, by the trusted authority client 520 and may be required for HTTPS outbound calls. According to some embodiments, there is one cred-store used by the provisioning application 510 to keep the keys/certificate (only used by the provisioning application 510 and one is created per landscape). In some cases, a database 530 table may store certificate metadata such as a certificate expiration date, and the provisioning application 510 may poll it once in per days to check all of the certificates that will expire in the next 90 days (and then fetch those tenant details and renew them). Note that the tenant resource manager 570 may need the tenant specific keys and certificates during provisioning. As a result, the provisioning application 510 may need to deploy the keystore before calling tenant resource manager 570 for tenant provisioning. FIG. 6 is an information flow diagram of a keystore renewal process 600 in accordance with some embodiments. The process 600 includes a provisioning application 610, a database 620, a trusted authority client 630, and a REST 640. The provisioning application 610 may, for example, perform a daily database 620 poll to fetch all of the certificates that will expire in the next 90 days and trigger Application Program Interfaces (APIs) for new certificates from the trusted authority client 630 as appropriate.

Figure 7:
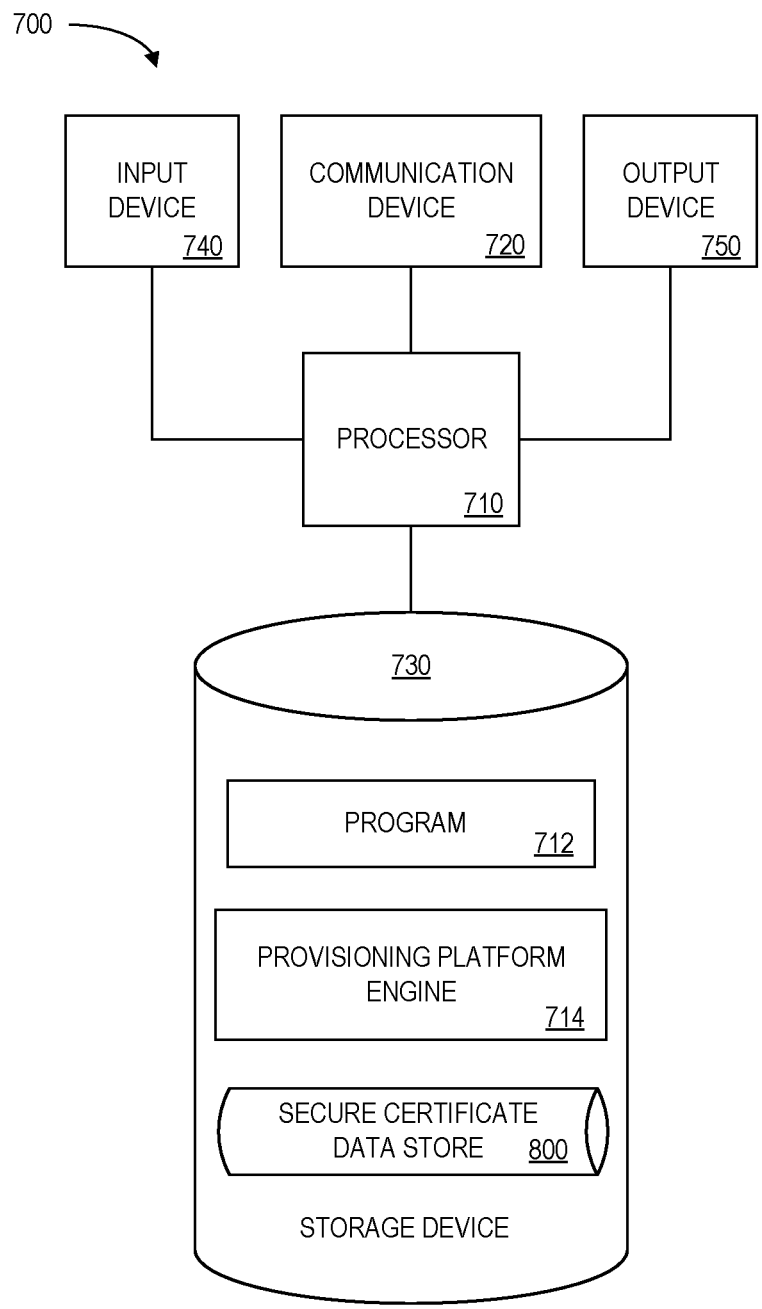
FIG. 7 is an apparatus or platform according to some embodiments.

Note that the embodiments described herein may also be implemented using any number of different hardware configurations. For example, FIG. 7 is a block diagram of an apparatus or platform 700 that may be, for example, associated with the systems 101, 400 of FIGS. 1B and 4, respectively (and/or any other system described herein). The platform 700 comprises a processor 710, such as one or more commercially available Central Processing Units ("CPUs") in the form of one-chip microprocessors, coupled to a communication device 760 configured to communicate via a communication network (not shown in FIG. 7). The communication device 760 may be used to communicate, for example, with one or more remote user platforms, administrator platforms, etc. The platform 700 further includes an input device 740 (e.g., a computer mouse and/or keyboard to input microservice and certificate information) and/an output device 750 (e.g., a computer monitor to render a display, transmit recommendations, and/or create reports about integration services, tenants, users, certificates, etc.). According to some embodiments, a mobile device, monitoring physical system, and/or PC may be used to exchange information with the platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or provisioning platform engine 714 for controlling the processor 710. The processor 710 performs instructions of the programs 712, 714, and thereby operates in accordance with any of the embodiments described herein. For example, the processor 710 may receive a user request for an integration service. The processor 710 may then transmit information to a platform resource manager processor to facilitate creation of a plurality of microservices resulting in implementation of the integration service for a tenant associated with the user. A multi-tenant keystore management service, automatically deployed upon implementation of the integration service, may automatically call a trusted authority platform. The processor 710 may then receive a signed security certificate from the trusted authority platform and add the signed security certificate to a keystore deployed to the tenant.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores a secure certificate data store 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Figure 8:
FIG. 8 is portion of a secure certificate data store in accordance with some embodiments

Referring to FIG. 8, a table is shown that represents the secure certificate data store 800 that may be stored at the platform 700 according to some embodiments. The table may include, for example, entries associated with signed pairs of certificates to enhance security in a cloud computing environment. The table may also define fields 802, 804, 806, 808, 810 for each of the entries. The fields 802, 804, 806, 808, 810 may, according to some embodiments, specify: a user identifier 802, a tenant identifier 804, an integration service identifier 806, microservices 808, and secure certificates 810. The secure certificate data store 800 may be created and updated, for example, when new users or tenants are added to a system, certificates expire or are terminated, etc.

The user identifier 802 might be a unique alphanumeric label that is associated with a user who may request an integration service associated with a cloud computing environment. The tenant identifier 804 may represent an enterprise, group of users, etc. who utilze the cloud computing environment. The integration service identifier 806 may define an application (e.g., a payroll or human resources application) composed of a number of different microservices 808. The secure certificates 810 may comprise or link to a signed security certificate issued by a trusted authority that may be enhance security in a cloud computing environment (e.g., in connection with outbound HTTPS calls).

Figure 9:
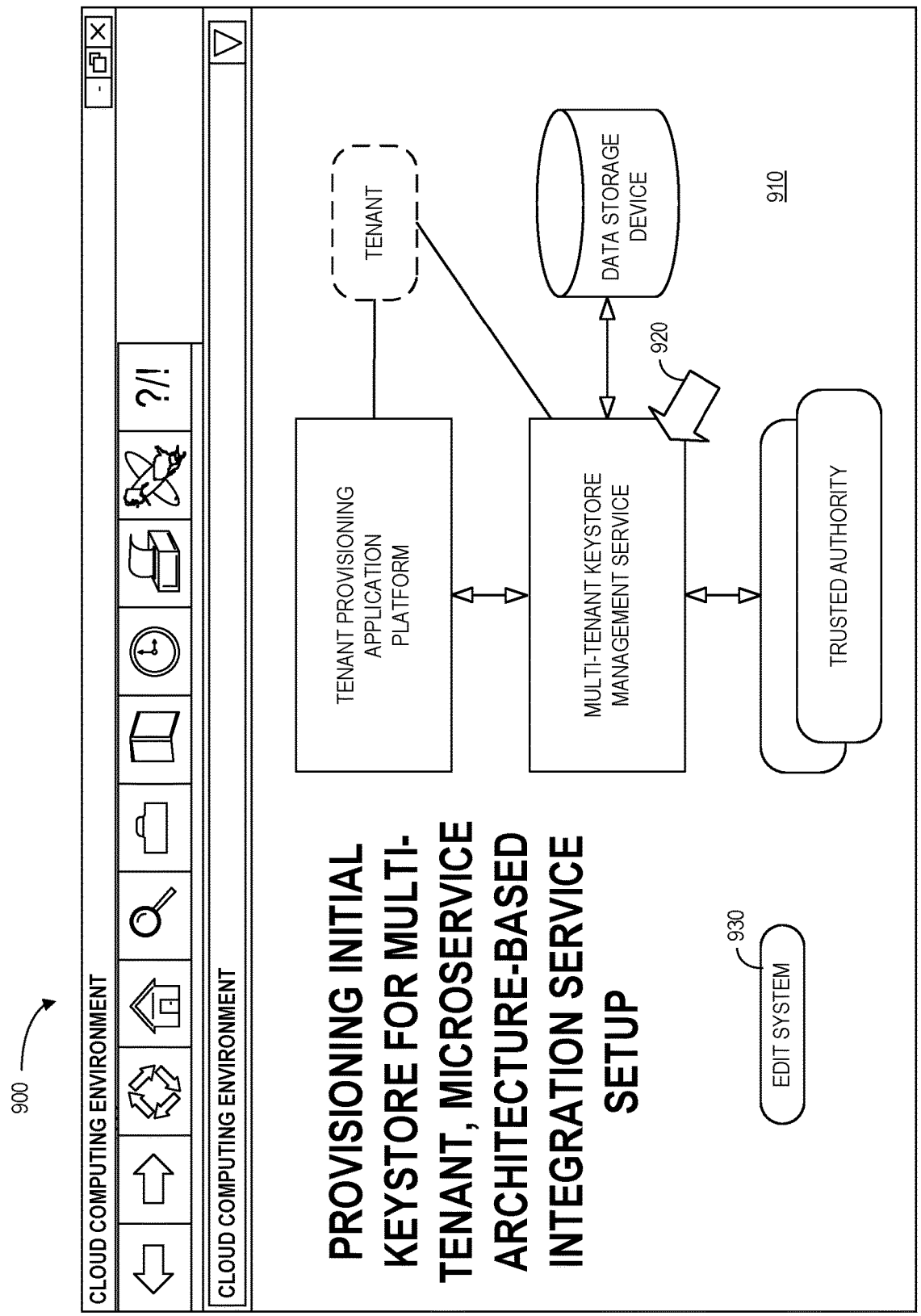
FIG. 9 is a human machine interface display according to some embodiments.

FIG. 9 is a human machine interface display 900 in accordance with some embodiments. The display 900 includes a graphical representation 910 of a keystore provisioning system in accordance with any of the embodiments described herein. Selection of an element on the display 900 (e.g., via a touch-screen or computer pointer 920) may result in display of a pop-up window containing more detailed information about that element and/or various options (e.g., to add a microservice, modify certificate expiration dates, etc.). Selection of an "Edit System" icon 930 may also let an operator or administrator adjust the operation of the keystore provisioning system.

Thus, embodiments may provide for the provision of an initial keystore for a multi-tenant, microservice architecture-based integration service in a cloud computing environment setup in a secure, automatic, and efficient manner. Note that embodiments may support microservice based architecture tenants (i.e., there might be several microservices needing the keystore). Moreover, embodiments may utilize a publish and subscriber pattern along with a provisioning application. In a microservice architecture and in a multi-cloud platform such as cloud foundry, the microservice may reside in their own space/org. These services together form a system. (and there can be multiple systems). Some embodiments keep a helper (e.g., a keystore deployer) service deployed per system (i.e., per space in cloud foundry). The nmster service knowns these helper services. Upon a provisioning request, the master service may identify the appropriate system and call that system's helper service. In this way, the isolation of different systems may be maintained. Moreover, according to some embodiments the keystore management service is singleton. By making this service singleton, the lifecycle management and trusted authority configurations can be done at one place by a secured administrator. For example, assume there are two systems (deployments): one for TEST and one for PROD. A tenant can be provisioned as a TEST tenant or as a PROD. The TEST tenant's certificate can be procured from the trusted authority's test endpoint (with limited validity) whereas for PROD tenants, the signed certificate may be procured from a production endpoint. Embodiments may provide such configurations after which everything may be be automated. Moreover, embodiments may support an alert feature to provide alerting/heads up on possible expiries of the certificate and automatic certificate renewal (e.g., based on the configuration, the keystore management service may automatically renew certificates). The automatic renewal may also consider the tenant eligibility (i.e., it might be the case where a customer is about to be terminated from the contract and there is no need for the renewal). Note that the commercial data of a customer usually resides with a cloud platform commercial service. Embodiments described herein may make a call to this service by the keystore management service periodically to check the customer quota and revoke certificates from tenants upon contract termination.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
   a tenant provisioning application platform processor configured to: (i) receive a user request to provision a tenant associated with a user and (ii) transmit information to a platform resource manager processor to facilitate creation of a plurality of microservices resulting in implementation of an integration service for the tenant; and
   a hardware processor to:
   automatically deploy, in response to the implementation of the integration service, a multi-tenant keystore management service to: (i) request a creation of a new keystore, (ii) automatically call a trusted authority platform, (iii) receive and securely store a signed security certificate from the trusted authority platform, and (iv) deploy the created keystore, including the stored signed security certificate, to an onboarded instance of the requested tenant.

2. The system of claim 1, wherein the multi-tenant keystore management service is at least one of: (i) combined with the tenant provisioning application platform processor, and (ii) a stand-alone service.

3. The system of claim 1, wherein the multi-tenant keystore management service further performs at least one of: (i) a password creation process, and (ii) signed security certificate validation.

4. The system of claim 1, wherein the multi-tenant keystore management service performs a lifecycle management process.

5. The system of claim 4, wherein the lifecycle management process supports automatic renewal of the security certificate upon an expiration event.

6. The system of claim 4, wherein the lifecycle management process supports termination of the tenant.

7. The system of claim 1, wherein at least one microservice is associated with at least one of: (i) an integration design user interface application, (ii) a monitoring user interface application, (iii) a runtime working node, (iv) an information storage service, and (v) database resources.

8. The system of claim 1, wherein the tenant provisioning application platform processor is associated with at least one of: (i) a Software-as-a-Service, and (ii) a Platform-as-a-Service.

9. The system of claim 1, wherein the request from the user is associated with a subscribe request.

10. The system of claim 1, further comprising:
the platform resource manager processor to: (i) create tenant specific resources, (ii) create tenant specific instances, and (iii) bind applications to the resources and instances.

11. The system of claim 10, wherein the platform resource manager processor has an inbuild event publish/subscribe framework.

12. The system of claim 1, wherein the tenant provisioning application platform processor is further to verify that tenant-onboarding is completed successfully.

13. A non-transitory, computer-readable medium having executable instructions stored therein, the medium comprising:
instructions to receive, at a tenant provisioning application platform processor, a user request to provision a tenant associated with a user;
instructions to transmit information to a platform resource manager processor to facilitate creation of a plurality of microservices resulting in an implementation of an integration service for the tenant;
instructions to, in response to the implementation of the integration service, automatically deploy a multi-tenant keystore management service;
instructions to request, by the multi-tenant keystore management service, a creation of a new keystore;
instructions to automatically call, by the multi-tenant keystore management service, a trusted authority platform;
instructions to receive and securely store a signed security certificate from the trusted authority platform;
instructions to onboard the requested tenant; and
instructions to deploy the created keystore, including the stored signed security certificate, to the onboarded tenant.

14. The medium of claim 13, wherein the multi-tenant keystore is at least one of: (i) combined with the tenant provisioning application platform processor, and (ii) a stand-alone service.

15. The medium of claim 13, wherein the multi-tenant keystore management service further performs at least one of: (i) a password creation process, and (ii) signed security certificate validation.

16. A computer-implemented method associated with a cloud computing environment, comprising:
receiving, at a tenant provisioning application platform processor, a user request to provision a tenant associated with a user;
transmitting information to a platform resource manager processor to facilitate creation of a plurality of microservices resulting in implementation of an integration service for the tenant;
in response to the implementation of the integration service, automatically deploying a multi-tenant keystore management service;
requesting, by the multi-tenant keystore management service, a creation of a new keystore;
automatically calling, by the multi-tenant keystore management service, a trusted authority platform;
receiving and securely storing a signed security certificate from the trusted authority platform;
onboarding the requested tenant; and
deploying the created keystore, including the stored signed security certificate, to the onboarded tenant.

17. The method of claim 16, wherein the multi-tenant keystore management service performs a lifecycle management process.

18. The method of claim 17, wherein the lifecycle management process supports automatic renewal of the security certificate upon an expiration event.

19. The method of claim 17, wherein the lifecycle management process supports termination of the tenant.

20. The method of claim 16, wherein at least one microservice is associated with at least one of: (i) an integration design user interface application, (ii) a monitoring user interface application, (iii) a runtime working node, (iv) an information storage service, and (v) database resources.

21. The method of claim 16, wherein the request from the user is associated with a subscribe request and the tenant provisioning application platform processor is associated with at least one of: (i) a Software-as-a-Service, and (ii) a Platform-as-a-Service.

* * * * *